US012560211B2

(12) United States Patent
Welin et al.

(10) Patent No.: US 12,560,211 B2
(45) Date of Patent: Feb. 24, 2026

(54) DEVICE FOR RESTORING BRAKE PADS, AND DISC BRAKE

(71) Applicant: HALDEX BRAKE PRODUCTS AB, Landskrona (SE)

(72) Inventors: Hans Welin, Sankt Ibb (SE); Göran Stensson, Sjöbo (SE)

(73) Assignee: Haldex Aktiebolag, Landskrona (SE)

( * ) Notice: Subject to any disclaimer, the term of this patent is extended or adjusted under 35 U.S.C. 154(b) by 317 days.

(21) Appl. No.: 17/602,705

(22) PCT Filed: Apr. 9, 2020

(86) PCT No.: PCT/EP2020/060265
§ 371 (c)(1),
(2) Date: Oct. 8, 2021

(87) PCT Pub. No.: WO2020/208194
PCT Pub. Date: Oct. 15, 2020

(65) Prior Publication Data
US 2022/0163080 A1 May 26, 2022

(30) Foreign Application Priority Data
Apr. 10, 2019 (DE) ..................... 10 2019 109 498.4

(51) Int. Cl.
*F16D 65/097* (2006.01)
*F16D 65/00* (2006.01)

(52) U.S. Cl.
CPC ..... *F16D 65/0979* (2013.01); *F16D 65/0978* (2013.01)

(58) Field of Classification Search
CPC ......................... F16D 65/0979; F16D 65/0978
See application file for complete search history.

(56) References Cited

U.S. PATENT DOCUMENTS

| | | | |
|---|---|---|---|
| 5,310,024 A | 5/1994 | Takagi | |
| 2014/0124304 A1 | 5/2014 | Asakura | |

FOREIGN PATENT DOCUMENTS

| | | | | |
|---|---|---|---|---|
| DE | 19623867 A1 | 1/1998 | | |
| DE | 102011118736 A1 | 5/2013 | | |
| DE | 102014112665 A1 * | 3/2016 | ......... | F16D 65/0972 |
| DE | 202016102686 U1 | 6/2016 | | |
| DE | 102015107956 A1 | 11/2016 | | |
| EP | 311239 A * | 4/1989 | .......... | F16D 55/226 |
| EP | 1443234 A1 * | 8/2004 | .......... | F16D 55/226 |
| EP | 1625312 B1 | 3/2007 | | |
| EP | 2050978 A2 | 4/2009 | | |

(Continued)

OTHER PUBLICATIONS

International Search Report issued in International Application No. PCT/EP2020/060265, Issued Aug. 12, 2020, 4 pages.

*Primary Examiner* — Melody M Burch
(74) *Attorney, Agent, or Firm* — Price Heneveld LLP

(57) ABSTRACT

A device for supporting and guiding a brake pad backplate and a brake pad arranged thereon in a pad slot of a disc brake, including a restoring device formed by two separately acting restoring elements. One restoring element is formed by a wire spring which serves to restore the lower portion of the brake pad backplate, while the other restoring element is formed by a pad hold-down spring which is capable of restoring the upper portion of the brake pad backplate.

17 Claims, 8 Drawing Sheets

(56)         References Cited

FOREIGN PATENT DOCUMENTS

| EP | 2644926 | A1 | | 10/2013 | |
|----|---------|----|---|---------|---|
| EP | 2831457 | B1 | | 7/2017 | |
| FR | 2553165 | A1 | * | 4/1985 | |
| JP | 01212133 | A | * | 8/1989 | |
| JP | H0738771 | U | | 7/1995 | |
| JP | H07280004 | A | | 10/1995 | |
| JP | 10110755 | A | * | 4/1998 | ........... F16D 55/227 |
| JP | 2010270799 | A | | 12/2010 | |

* cited by examiner

Fig. 7a                    Fig. 7b                    Fig. 7 c
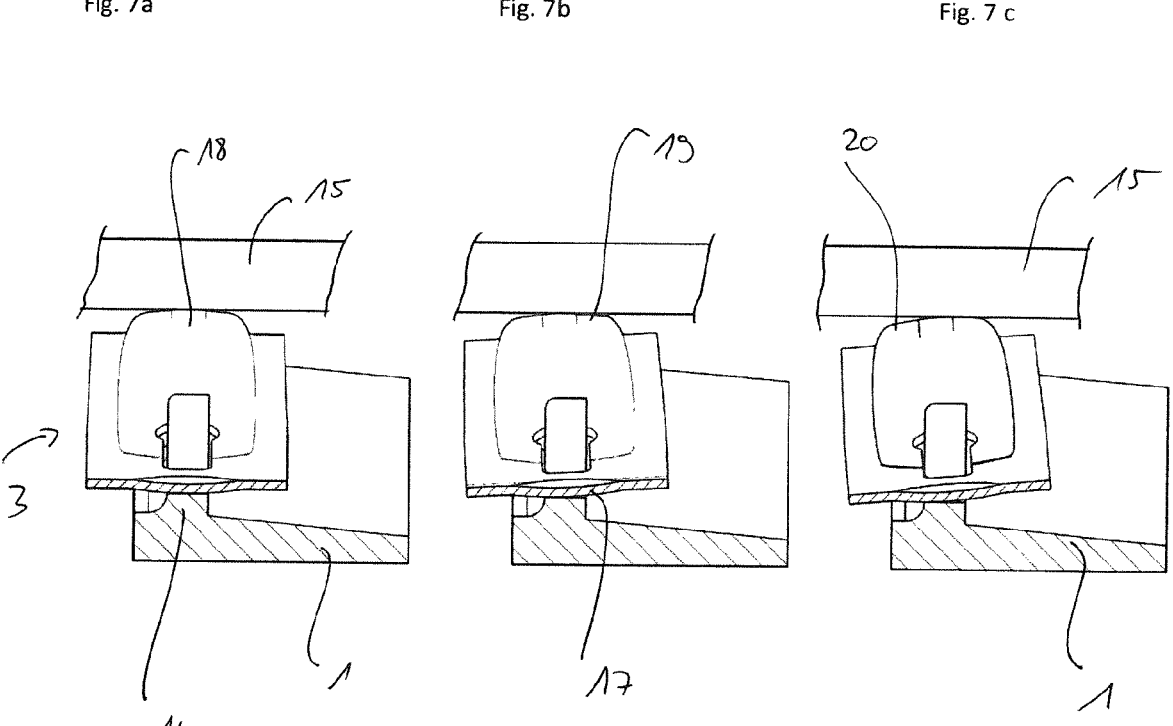

DEVICE FOR RESTORING BRAKE PADS, AND DISC BRAKE

FIELD OF THE INVENTION

The present invention relates to a device for supporting, guiding and restoring a brake pad backplate and a brake pad, and to correspondingly designed mechanisms therefor.

BACKGROUND OF THE INVENTION

In sliding caliper brakes, the sliding caliper and the brake carrier that slidably supports it form, so to say, joint so-called pad slots into which the brake pads can be inserted from above. Thereby, the sides of the backplate or brake pad holder plate of the brake pads are slidingly supported on vertical guide surfaces, the so-called horns, of the brake carrier. The brake pad backplates are supported by pad retainer or hold-down springs, generally in the form of leaf springs, against an abutment element which bridges the free space of the pad slots of the brake caliper.

When the brake is applied, the brake pad on the brake application side is pressed against the brake disc, while the opposite brake pad also comes into contact with the brake disc as a reaction to this due to the counter-directional sliding movement of the brake caliper. At the end of the braking process, the brake application device and the brake pads with their brake pad backplates must be returned to their respective starting positions. While a separate return mechanism is provided for the brake application device, e.g. a return spring acting between the brake application device and the brake caliper or a return spring already functionally integrated in the latter, independent devices have been provided in the prior art for the brake pads, which act between the lateral wall of the pad slots and the brake pad backplates. These consist of spring elements, some of which are under preload, which deform elastically during the braking stroke as a result of the relative movement between the brake pad backplate and the wall of the slot, thus forming a restoring force which comes into play at the end of the braking process when no more braking force is acting, thus helping the brake pad backplate to move backwards.

Exemplary spring mechanisms between the brake pad backplate and the lateral guide surfaces of the pad slot are known from EP 1 625 312 B1, DE 196 23 867 C2 and EP 2 644 926 B1. A spring element that partially embraces the brake pad on both sides is also known from EP 2 831 457 B1.

All the above-mentioned devices for resetting, some of which can also serve as anti-vibration devices, have in common that they are very difficult to install only; in particular, it is not possible to insert brake pad backplates provided with such spring mechanisms into the pad slots in a simple manner from above without resistance and without obstacles. In addition, design modifications to the side walls of the pad slot and/or to the brake pad backplate itself are sometimes necessary in order to enable the functionality of these spring elements in the first place, such as undercuts creating recesses that further increase the manufacturing expense.

In addition, the spring elements not only generate restoring forces which then act or are aligned in the axial direction, i.e., essentially parallel to the axis of the brake disc, but in some cases also exert tangential and/or radial forces between the lateral walls of the brake carriers and the brake pad backplates, which oppose a proper restoring operation with a corresponding resistance which may not be negligible.

SUMMARY OF THE INVENTION

Based thereon, it is an object of the present invention to provide improved functionality with respect to the brake pad resetting process in a disc brake. A further object is to provide a device for resetting a brake pad which device is easy to assemble and functionally reliable.

In a first aspect, therefore, the invention proposes a device for supporting and guiding a brake pad backplate and a brake pad disposed thereon in a pad slot of a disc brake, comprising a restoring device cooperating with the brake pad backplate and adapted to generate a restoring force upon movement of the brake pad in the axial direction accomplished as a result of the braking stroke, wherein the restoring device consists of a first restoring element, which is constructed and arranged to restore the lower region of the brake pad backplate, and of a second restoring element, which is separate therefrom and which is constructed and arranged to restore the upper region of the brake pad backplate opposite the lower region.

Here, axial direction refers to the direction of movement of the brake pads, thus parallel to the axis of the brake disc and in the direction of the applied clamping force, whereby by the upper region of the brake pad backplate is meant that section which faces upwards towards the opening of the brake slot in the brake caliper and on which the pad hold-down spring engages, while the lower region is opposite this section.

The advantage of using at least two separate restoring elements, each acting independently in interaction with the brake pad backplate and with abutments, according to the invention is that the restoring forces and thus the restoring behavior can be better adjusted. The two restoring elements, designed as separate components, each act independently and thus each exert their own restoring force, but are preferably coordinated with one another in such a way that they interact in such a way that they implement a common, uniform restoring of the brake pad backplate, above all via a uniform force distribution.

For better adjustment of the resulting restoring forces, it can therefore be provided in accordance with the invention that the first restoring element and/or the second restoring element is/are under a defined pretension.

In one embodiment of the device according to the invention, the first restoring element can be designed to act between lateral guide surfaces of the pad slot and the brake pad backplate in such a way that the brake pad backplate is slidingly supported on the lateral guide surfaces of the pad slot.

Preferably, this restoring element is designed as a spring element that is arranged on the brake pad backplate by means of at least one fastening element in such a way that the spring element is only able to absorb axial forces.

In other words, in contrast to the previously described solutions from the prior art, the spring element is designed and arranged on the brake pad backplate in such a way that, in relation to the axis of the brake disc or the direction of movement of the brake pad backplate, it cannot absorb any further forces in the radial and/or tangential direction, i.e. transversely to the axis of the brake disc, which would otherwise oppose a certain resistance to a proper, continuous resetting in the axial direction.

The at least one fastening element can be designed to adjust the restoring force. Ideally, the spring element is arranged movably relative to the at least one fastening element, the degree of movability of the spring element relative to the at least one fastening element co-determining the restoring force at least in part.

In a preferred embodiment, the spring element is designed as a suitably coiled and curved wire spring which, on the one hand, extends between the two sides of the brake pad backplate and, on the other hand, is arranged in such a way that its free ends, resting against the two sides of the brake pad backplate, extend in the axial direction, i.e. in the direction of the brake disc. The wire spring can have a spring rate corresponding to the force levels normally occurring in such disc brakes.

The wire spring is thereby provided on the outside of the brake pad backplate, opposite the brake lining, whereby the fastening elements can be designed as clips or similarly designed means which are screwed, riveted or otherwise fastened to the rear side of the brake pad backplate. The arrangement, number and distribution of the clips is thereby selected so that the wire spring can transmit an axial force to the brake pad backplate, but in the mounted state does not absorb any forces in the radial or tangential direction, i.e., transversely to the wheel axis. Furthermore, the arrangement of the clips is such that the entire arrangement consisting of brake pad backplate and brake pad with the wire spring can be inserted without further ado into a standard slot of a disc brake without requiring any structural modifications to the brake caliper and/or the brake carrier. In this respect, the device according to the invention as well as a brake pad backplate using such a device are particularly suitable for retrofitting existing disc brakes. If necessary, the upper edges of the lateral guide surfaces, the "horns" of the brake carrier, can be inclined so that the pad slot formed by them widens in order to facilitate the initial insertion of the unit consisting of brake pad backplate, brake pad and wire spring.

As mentioned above, the wire spring extends across the entire width of the brake pad backplate and is designed to act between the lateral walls, the "horns" of the brake carrier. For this purpose, according to the invention the wire spring is preloaded and is held in this preloaded position by the aforementioned clips. When the brake pad is mounted in the brake carrier, there is no further contact between the clips and the wire spring. This arrangement reduces the need for high tolerances in the manufacture of the wire spring, and at the same time allows easy mounting and replacement of the brake pads.

The fact that the free ends of the wire spring extend in the axial direction between the brake pad backplate and the horns of the brake carrier means that the friction between them can be significantly increased. The friction behavior desired there, which in the following has an influence on the achievable restoring force, can be specifically determined according to the invention by a suitable selection of the friction pairing, i.e., the material selection and surface quality of the wire spring, the length of the free ends in contact with the slot wall and/or the pretension inherent in the wire spring.

When the brake is applied and the brake pads are pressed towards the brake disc, there is a relative movement between the brake pad backplates and the horns of the carrier. The increased friction that occurs thereby between the free ends of the wire springs and the horns of the carrier causes an axial preload in the wire spring. After the brake is released, a return spring of the disc brake returns the brake application device to its original, retracted position, allowing the caliper to move away from the brake disc.

According to the invention, the energy stored in the wire spring in advance as a result of the braking stroke then assists both the inner and outer brake pads to follow the brake piston and caliper, respectively, to their respective original positions, taking into account any wear adjustment.

According to the invention, it is possible to introduce a defined axial pretension into this spring element by means of the arrangement and dimensioning of the wire spring, in particular the length of the axially extending ends, which pretension acts against the holding clips and which allows the restoring force to be set to a suitable, desired level.

The device according to the invention may further comprise a second restoring element, which is also designed as a spring element in such a way that it is mounted between the brake pad backplate and an abutment which is stationary with respect to the brake caliper so as to be movable in the axial direction, preferably tiltable between them. The movable or tiltable arrangement is designed in such a way that a restoring torque or restoring force is generated which are aligned to restore the upper region of the brake pad backplate.

In a preferred embodiment of the device according to the invention, the spring element can be formed by a brake pad hold-down or retainer spring, which is needed anyway and is already present to hold the brake pad in the pad slot, and which is arranged on the brake pad backplate and is supported on an abutment plate of the brake caliper.

According to the invention, in order to generate a defined restoring torque, the brake pad hold-down spring has a defined sequence of differently inclined contact surfaces with respect to the abutment plate, i.e., upwards.

Seen in cross-section, the spring element, which is generally designed as a leaf spring, can, for example, consist of three different parts: a rounded central surface or edge, which is normally in contact with the abutment when the brake is released, and, to the left and right of this, outer inclined, flat sections, which come into contact with the abutment after a certain tilting or rotating movement of the leaf spring.

According to one embodiment of the invention, the angle of inclination of the inclined contact surfaces is to be such that the radius with respect to a tilting movement corresponds to at least half the distance between the upper surface of the brake pad backplate and the lower surface of the abutment plate.

Accordingly, in a further aspect, the invention relates to a pad hold-down spring for a brake pad backplate for a disc brake comprising two apertures into which lugs of the brake pad backplate are engageable to secure the pad hold-down spring to the brake pad backplate to prevent loss, wherein a sequence of contact surfaces extends between the two apertures, by means of which the pad hold-down spring can be supported on an abutment of the disc brake, and wherein the curvatures of the contact surfaces are selected transversely to the longitudinal extent of the pad hold-down spring in such a way that the latter can be tilted between the abutment and the brake pad backplate during a braking stroke.

According to the invention, the pad hold-down spring is shaped and designed in such a way that, as a result of a tilting movement, it is capable of generating a torque of defined magnitude counteracting to the tilting direction.

In a still further aspect of the invention, the first restoring element and the second restoring element are to be tuned with respect to each other in terms of arrangement and resulting elastic deformation, taking into account the dimensions and weight of the unit comprising brake lining and brake pad backplate, such that the respective resulting restoring forces and/or restoring torques are substantially equal.

In other words, while the lower restoring element (wire spring) serves to exert a restoring force on the lower portion of the unit, the upper restoring element (pad hold-down spring) serves at the same time to exert a restoring moment or a resulting restoring force only on the upper portion, wherein according to the invention both resulting restoring forces are coordinated via the respective constructive design of the restoring elements in such a way that a uniform force distribution on the brake pad is achieved with respect to the restoring movement.

The invention also relates to correspondingly designed brake pad backplates and to a disc brake implementing the device according to the invention.

BRIEF DESCRIPTION OF THE DRAWINGS

Further features and advantages of the invention will be apparent from the following description of the embodiments illustrated with reference to the accompanying drawings, in which:

FIGS. 7*a* to 7*c* show a schematic sequence of different sectional views illustrating the tilting motion.

DETAILED DESCRIPTION OF THE INVENTION

Figure 1:
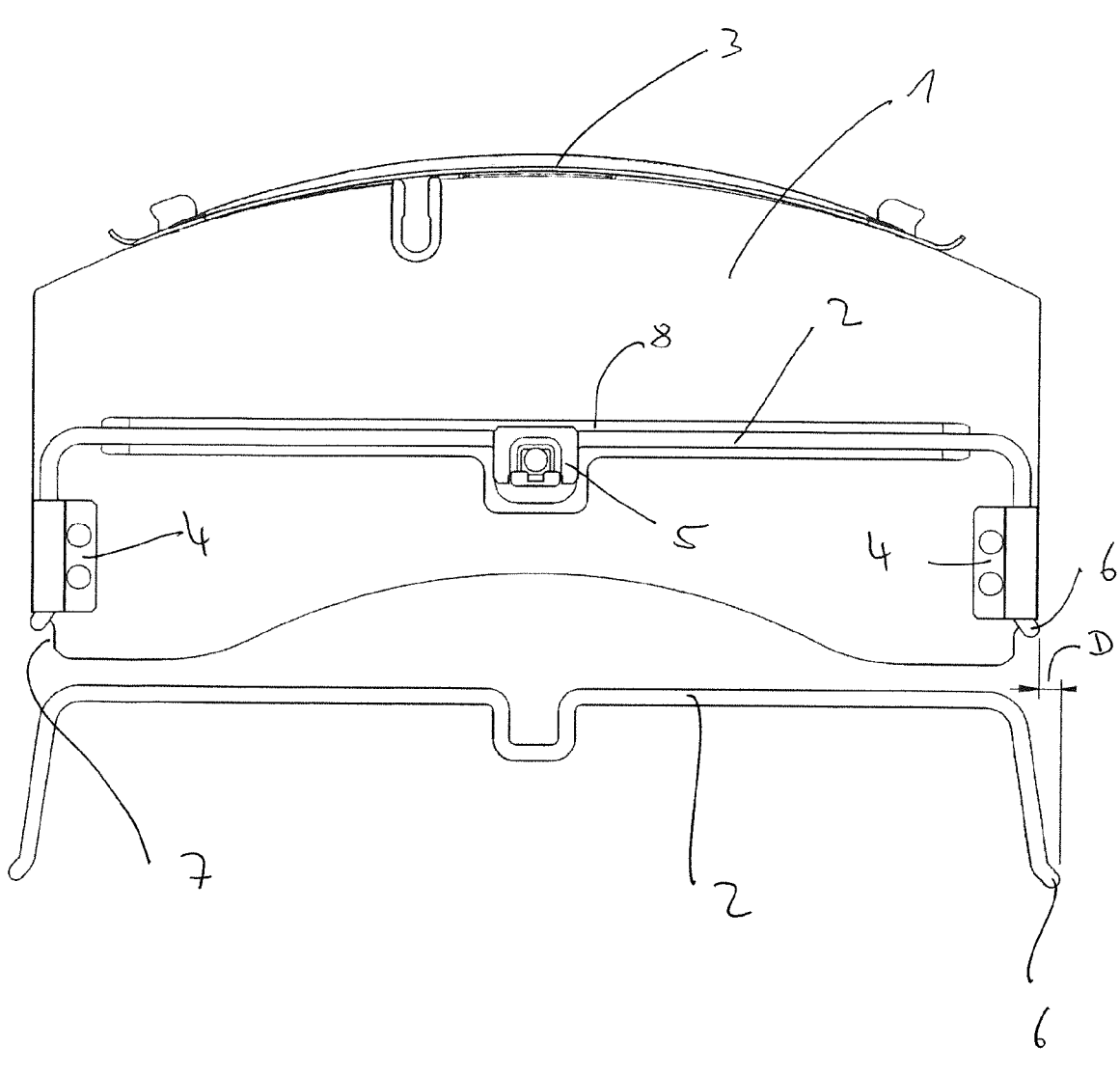
FIG. 1 schematically is a rear view of a brake pad backplate with a mounted wire spring in a first embodiment and, in comparison, the wire spring in an unmounted state.
Figure 2:
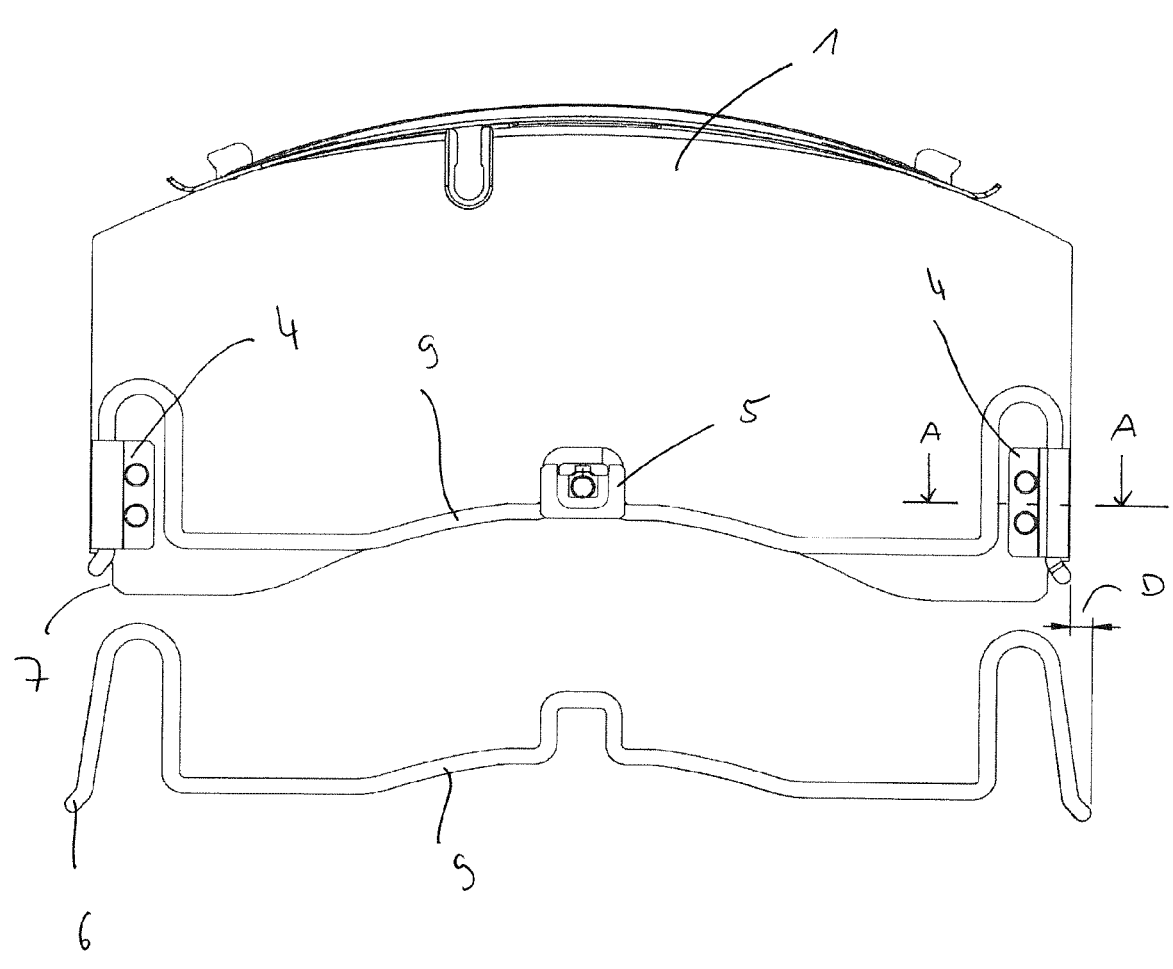
FIG. 2 schematically is a rear view of a brake pad backplate with a mounted wire spring in a second embodiment and, in comparison, the wire spring in an unmounted state.

FIG. 1 shows an exemplary rear view of a rear plate or brake pad backplate 1.

The brake pad backplate 1 comprises a first restoring element in the form of a wire spring 2 in a first embodiment and a second restoring element in the form of a pad hold-down spring 3. The restoring elements 2 and 3 are each independent components.

The wire spring 2 is bent accordingly and extends between both lateral ends of the brake pad backplate 1.

The wire spring 2 is arranged on the brake pad backplate 1 by means of two lateral fastening clips 4 and a central fastening clip 5, the fastening clips 4, 5 being riveted to the rear side, for example.

As can be seen in the two illustrations of FIG. 1, during assembly the wire spring 2 is forced inwards on both sides by the distance D, whereby the free ends 6 of the wire spring 2 then rest in a lateral recess 7 of the brake pad backplate 1 in each case, and in such a way that these free ends 6 extend exclusively in the axial direction, i.e. the direction of displaceability of the brake pad backplate 1 or the direction of application of the clamping force.

For stability reasons, the rear side of the brake pad backplate 1 may have a linear transverse guide 8 in which the transverse sections of the wire spring 2 are immovably enclosed.

FIGS. 2 to 5 show a second embodiment of a wire spring 9.

This is likewise fastened to the brake pad backplate 1 for a brake lining 14 by two lateral fastening clips 4 and a central fastening clip 5 in such a way that lateral compression by an offset D takes place on both sides, as a result of which a pretension is built up in the wire spring 9. The free ends 6 are received in the lateral recesses 7 of the brake pad backplate 1.

Figure 4:
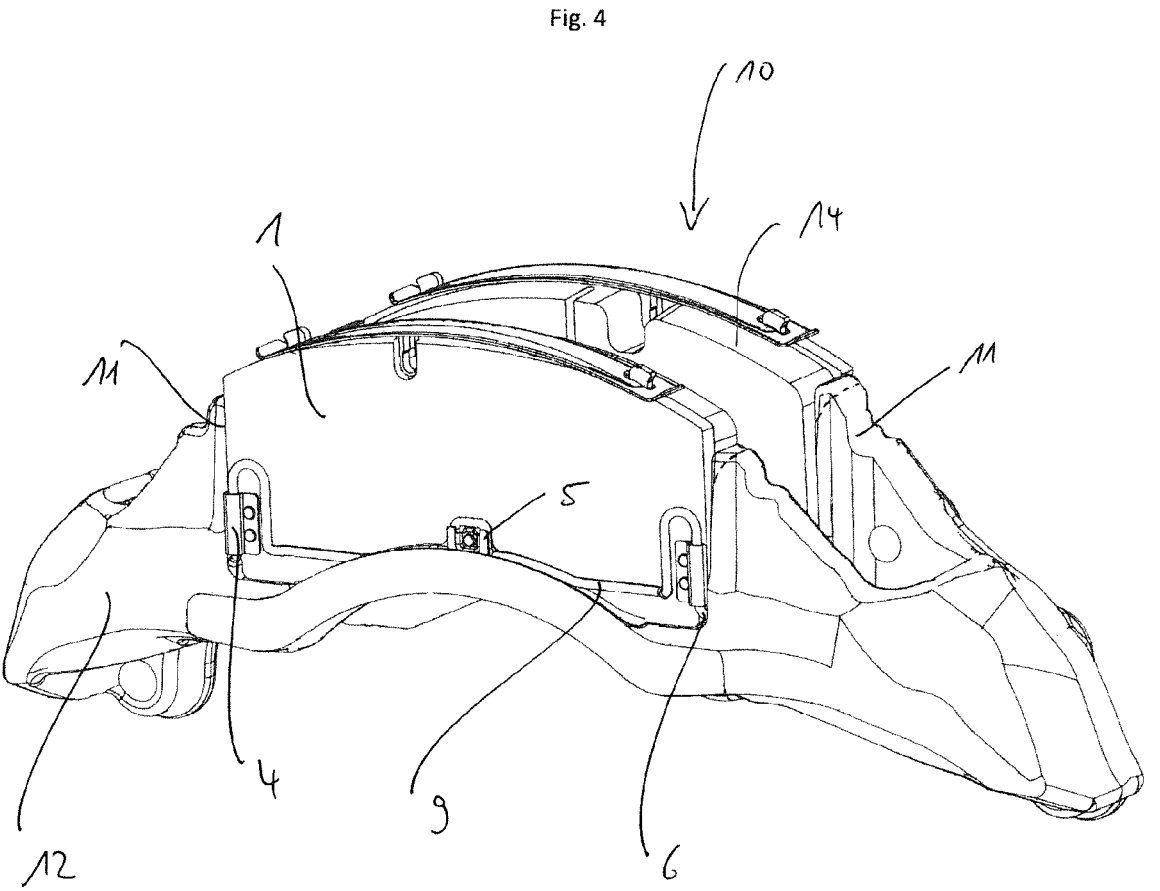
FIG. 4 is a perspective view with brake pads inserted in a brake carrier with the wire spring according to the second embodiment.

Just as in the first embodiment, this allows, as shown in FIG. 4, the brake pad backplate 1 together with the wire spring 9 to be inserted without difficulty into a pad slot 10 formed, inter alia, by the lateral horns 11 of a brake carrier 12 which slidably supports a sliding caliper not shown. For the purpose of easier insertion, the lateral surfaces or horns 11 may widen upwardly by inclined, chamfered or rounded surfaces, which is indicated schematically by the dashed lines.

Figure 3:
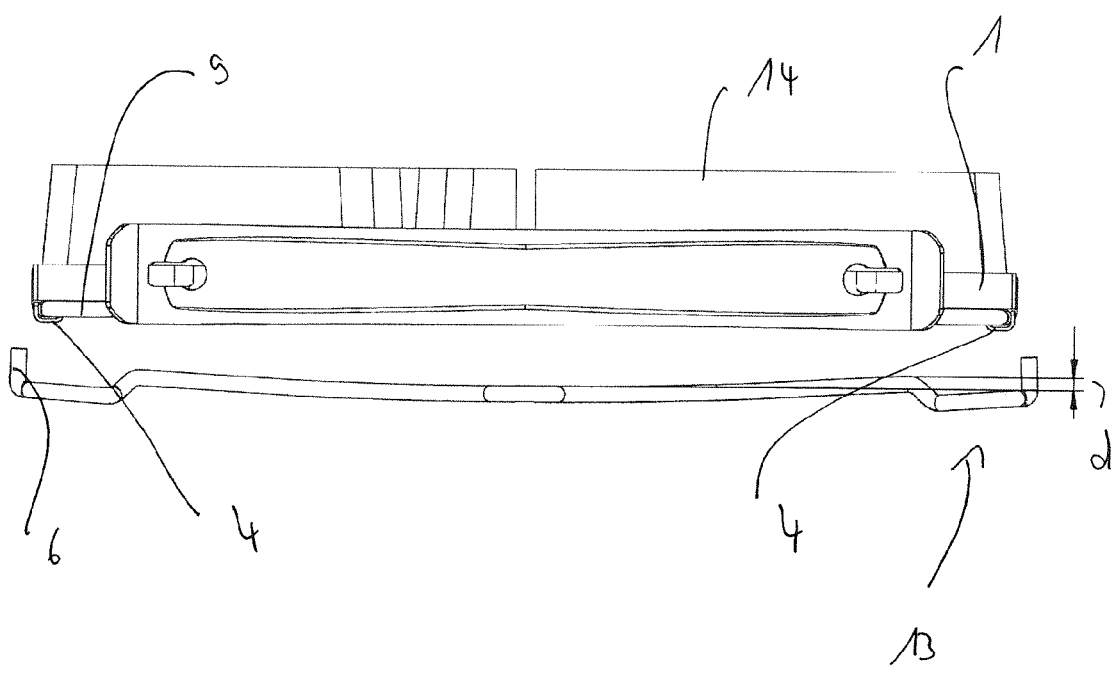
FIG. 3 is a top view of the brake pad backplate and the wire spring from FIG. 2.

Furthermore, as shown in FIG. 3, viewed from above, the wire spring 9 has such a shape that the lateral regions 13 thereof, which cooperate with the lateral fastening clips 4, are offset towards the center thereof by a distance d in the axial direction, as a result of which, when mounted on the backplate 1, namely by fastening via the central clip 5, a pretension can also be introduced into the wire spring 9.

Figure 5:
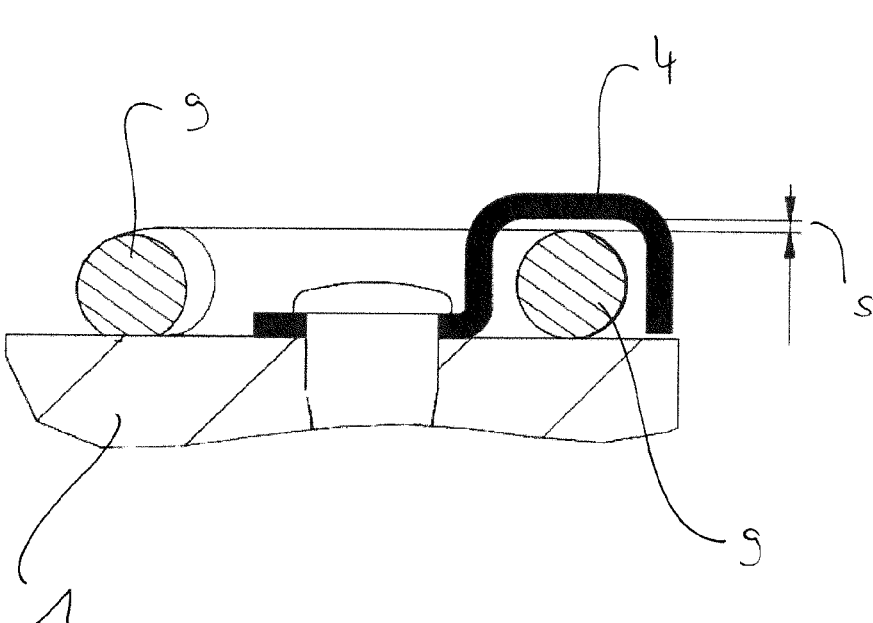
FIG. 5 is a partial view in cross-section along A-A from FIG. 2.
Figure 5:
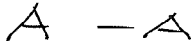
Figure 6A:
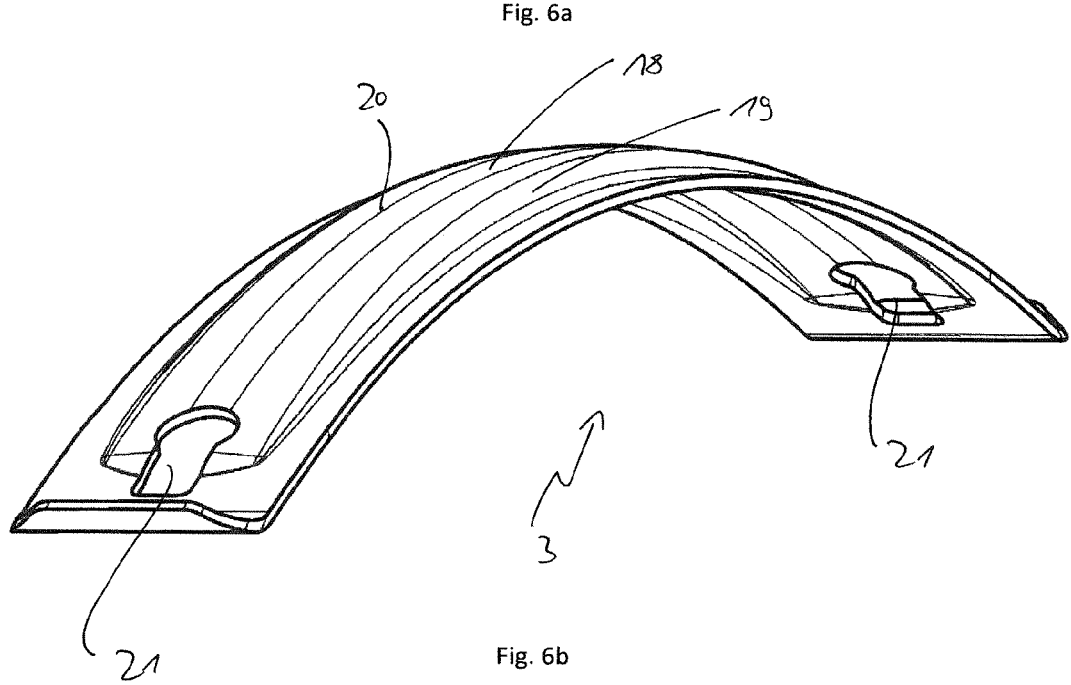
FIG. 6*a* is a perspective view of an upper restoring element.
Figure 6B:
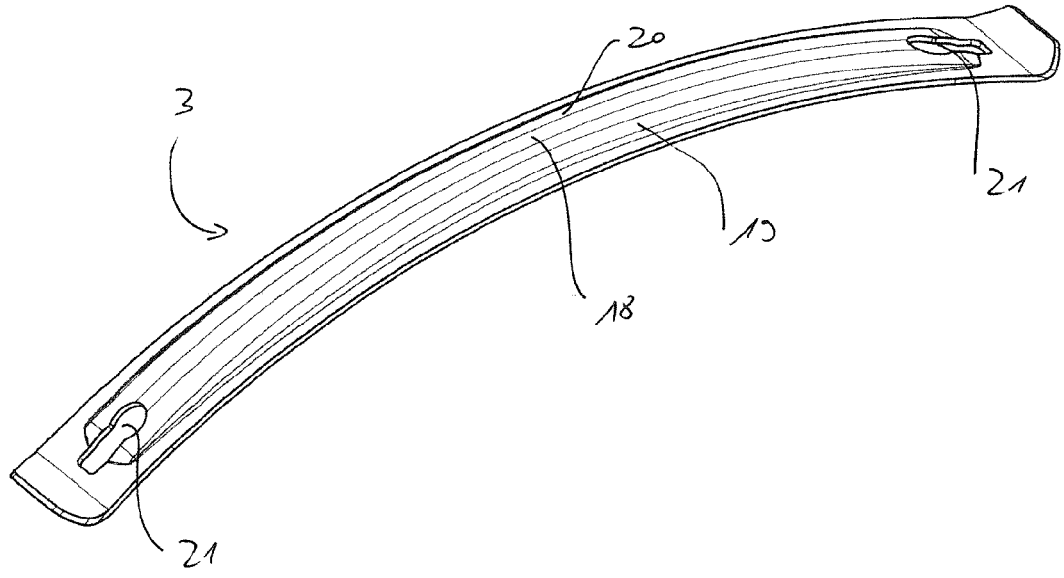
FIG. 6*b* is another perspective view of the upper restoring element.
Figure 6C:
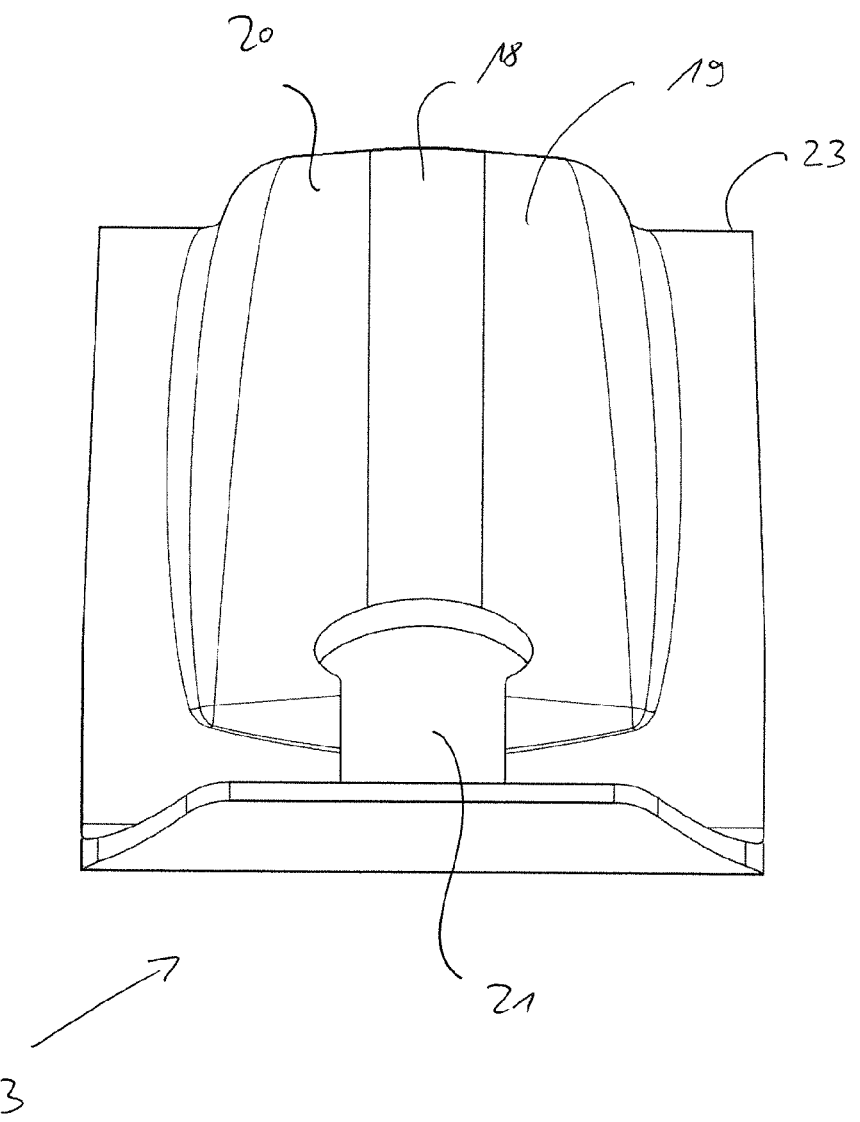
FIG. 6*c* is a view in the longitudinal direction of the restoring element.

Furthermore, the shape selected in this way with the offset d means that in the assembled state the wire spring 9 is not in contact with the inner surface of the clip 4, as shown in FIG. 5, but is spaced apart by a distance s which allows the wire spring 9 to move or be elastically deformed in the axial direction.

According to the invention, the wire springs 2 and 9 serve to ensure that, in particular, the lower edge of the brake pad is restored to an initial position when braking force is no longer applied. It can be seen that as a result of the assembly with the lateral fastening clips 4, a pretension is induced in the wire springs 2 and 9. The free ends 6 are bent towards the brake disc to increase the friction between the surfaces of the horns 11 of the carrier 12 and the wire springs 2, 9.

When the brake is applied and the brake pads are forced toward the brake disc, relative movement occurs between the brake pad backplate 1 and the horns 11 of the carrier 12. The resulting increased friction between the free ends 6 of the wire springs 2, 9 and the horns 11 of the carrier 12 causes an axial pretension in the wire springs 2, 9. After the brake is released, a return spring of the disc brake forces the brake piston back to its original retracted position in the caliper, allowing the caliper to move away from the brake disc. The energy stored in the wire springs 2, 9 as a result of both the predefined pretension and the counter- or pretension resulting from friction helps both the inner and outer brake pads to follow the brake piston and the brake caliper to their original positions, minus any wear generated and to be compensated for.

By introducing an axial pretension into the wire springs 2, 9, which acts against the holding clips 4, 5, it is possible to adjust the restoring force to a suitable level. Here, the dimension in relation to the lateral compression D, the axial bending d and the mobility s of the wire springs 2, 9 relative to the clips 4,5 can be set in such a way that the restoring force can be adjusted specifically, in particular also in comparison with the restoring force of the upper restoring element 3.

FIGS. 6a to 6c and 7a to 7c show an upper restoring element 3 according to the invention and its mode of operation, as it can be mounted or is mounted on a brake pad backplate 1.

The upper restoring element is formed by a specially designed pad hold-down spring 3, as used in a known manner between an abutment 15 of the brake caliper and the upper side of a brake pad backplate 1. The design and mode of operation of the pad hold-down spring 3 described below have an independent inventive significance.

The pad hold-down spring 3 has two openings 21 which serve to receive lugs 22 of the brake pad backplate 1. Typically, the pad hold-down spring 3 is clamped between the abutment 15 and the brake pad backplate 1 to exert a downward spring holding force so that the lugs 22 cannot move out of the openings 21.

In accordance with the invention, the pad hold-down spring 3 is tiltably mounted between the stationary abutment 15 of the brake caliper and a section 16 of the brake pad backplate 1. In the lower region, the spring 3 has a curvature 17 which supports the rotational mobility at this point, namely at the outer edges in the region of the openings 21 where the pad hold-down spring 3 actually rests on the surface 16 of the brake pad backplate 1.

Between the two openings 21, the pad hold-down spring 3 has a sequence of longitudinally extending, different contact surfaces with which it is supported on the abutment 15, a central, slightly curved contact surface 18 and lateral contact surfaces 19 and 20 which slope downwards at an angle thereto.

According to the invention, these contact surfaces 18, 19, 20, which, so to say, are curved outwards to form a curved tilting surface with respect to the abutment 15, are designed in such a way that a defined restoring behavior can be set, which comes into effect at the end of the braking stroke.

The restoring behavior resulting from this restoring element 3 with respect to the upper edge or the upper section is to be illustrated in more detail in FIGS. 7a to 7c by the sequence of schematic sectional views.

FIG. 7a shows the spring 3 in a rest position, in FIG. 7b in a slightly inclined intermediate position at the start of brake application with an initially slightly displaced brake lining and in FIG. 7c in a position with a fully achieved tilt angle.

Thereafter, further movement of the brake pad causes the spring 3 to slide or slip under the abutment plate 15.

As a result of the tilting movement along the abutment plate 15, there is also a compression of the spring element 3 in the direction towards the brake pad backplate 1. During tilting, a sequence of contact points or lines ultimately come into contact with the underside of the abutment plate 15 one after the other. Compression and rotation of the spring element 3 generate an axial pretension via a counteracting torque, which is shown as an example in FIG. 7c.

This torque then assists in the following, as soon as no more clamping force is applied and the brake pad does not move further, to bring the brake pad backplate 1 to its original position, in particular with respect to the upper section.

In a particular embodiment, such restoring behavior proves effective when a radius with respect to the contact points is more than half the distance with respect to the height between the upper contact surface to the abutment plate 15 and the lower support surface to the section 16.

Furthermore, the spring element 3 still has lateral flat end surfaces or edges 23 on both sides which limit the extent of tiltability to certain angles.

The invention claimed is:

1. A device for supporting and guiding a brake pad backplate and a brake pad arranged thereon in a pad slot of a disc brake, having a restoring device which interacts with the brake pad backplate and is configured to generate a restoring force when the brake pad moves in an axial direction as a result of a braking stroke, wherein the restoring device comprises a first restoring element, which is configured to restore a lower region of the brake pad backplate, and a second restoring element, which is separate from the first restoring element and is configured to restore an upper region of the brake pad backplate opposite the lower region;

wherein the first restoring element comprises a wire spring which is arranged on a rear side of the brake pad backplate between both sides of the brake pad backplate via at least one fastening element to prevent loss such that free ends of the wire spring which abut against the two sides of the brake pad backplate, and extend in the axial direction act between lateral guide surfaces of the pad slot and the brake pad backplate such that the brake pad backplate is slidingly supported on the lateral guide surfaces of the pad slot, and such that the wire spring is only able to absorb axial forces;

wherein the second restoring element comprises a pad hold-down spring which comprises two openings into which lugs of the brake pad backplate are configured to engage in order to secure the pad hold-down spring on the brake pad backplate such that the pad hold-down spring cannot loosen, a sequence of differently inclined contact surfaces extends between the two openings via which the pad hold-down spring can be supported on a stationary abutment of the disc brake, and curvatures of the contact surfaces being selected transversely with respect to a longitudinal extent of the pad hold-down spring such that the pad hold-down spring is tilted between the abutment and the brake pad backplate during a braking stroke;

wherein a curved portion of the pad hold-down spring rests on the brake pad backplate thereby supporting the tilting movement of the pad hold-down spring; and wherein the curved portion of the pad hold-down spring that rests on the brake pad backplate is curved transversely with respect to the longitudinal extent of the pad hold-down spring.

2. The device according to claim 1, in which the first restoring element and/or the second restoring element is/are under a defined pretension.

3. The device according to claim 1, in which the at least one fastening element is configured to adjust the restoring force.

4. The device according to claim 3, in which the wire spring is movably arranged relative to the at least one fastening element.

5. The device according to claim 4, in which a degree of mobility of the wire spring relative to the at least one fastening element co-determines the restoring force at least in part.

6. The device according to claim 1, in which an angle of inclination of the inclined contact surfaces is selected such that a radius with respect to a tilting movement corresponds to at least half of a distance between a top surface of the brake pad backplate and a bottom surface of the abutment plate.

7. The device according to claim 1, in which the wire spring and the pad hold-down spring are tuned with respect to each other in terms of arrangement and resulting elastic deformation, taking into account dimensions and weight of a unit consisting of the brake pad and the brake pad backplate such that the respective resulting restoring forces and/or restoring torques are essentially equal in magnitude.

8. A disc brake comprising the device according to claim 1.

9. A device for arranging and guiding a brake pad backplate and a brake pad in a brake slot of a disc brake, comprising a first restoring element which is arranged on the brake pad backplate such that a lower region of the brake pad backplate can be restored and a second restoring element which is arranged on the brake pad backplate such that an upper region of the back pad backplate can be restored;

wherein the first restoring element comprises a wire spring which is arranged on a rear side of the brake pad backplate between both sides of the brake pad backplate via at least one fastening element to prevent loss such that free ends of the wire spring which abut against the two sides of the brake pad backplate extend in an axial direction and act between lateral guide surfaces of the pad slot and the brake pad backplate such that the brake pad backplate is slidingly supported on the lateral guide surfaces of the pad slot, and such that the wire spring is only able to absorb axial forces;

wherein a second restoring element comprises a pad hold-down spring which comprises two openings into which lugs of the brake pad backplate are configured to engage in order to secure the pad hold-down spring on the brake pad backplate such that the pad hold-down spring cannot loosen, a sequence of differently inclined contact surfaces extends between the two openings via which the pad hold-down spring can be supported on a stationary abutment of the disc brake, and curvatures of the contact surfaces being selected transversely with respect to a longitudinal extent of the pad hold-down spring such that the pad hold-down spring is tilted between the abutment and the brake pad backplate during a braking stroke;

wherein a curved portion of the pad hold-down spring rests on the brake pad backplate thereby supporting the tilting movement of the pad hold-down spring; and wherein the curved portion of the pad hold-down spring that rests on the brake pad backplate is curved transversely with respect to the longitudinal extent of the pad hold-down spring.

10. The device according to claim 9, in which the wire spring is under a defined pretension.

11. The device according to claim 9, in which the wire spring element is movably arranged relative to the at least one fastening element.

12. A disc brake, comprising:

a device for arranging and guiding a brake pad backplate with a brake pad in a brake slot of a disc brake, comprising a restoring element which is arranged on the brake pad backplate such that an upper region of the brake pad backplate can be restored;

wherein the restoring element comprises a pad hold-down spring which comprises two openings into which lugs of the brake pad backplate are configured to engage in order to secure the pad hold-down spring on the brake pad backplate such that the pad hold-down spring cannot loosen, a sequence of differently inclined contact surfaces extends between the two openings via which the pad hold-down spring can be supported on a stationary abutment of the disc brake, and curvatures of the contact surfaces being selected transversely with respect to a longitudinal extent of the pad hold-down spring such that the pad hold-down spring is tilted between the abutment and the brake pad backplate during a braking stroke;

wherein a curved portion of the pad hold-down spring rests on the brake pad backplate thereby supporting the tilting movement of the pad hold-down spring; and wherein the curved portion of the pad hold-down spring that rests on the brake pad backplate is curved transversely with respect to the longitudinal extent of the pad hold-down spring.

13. A disc brake, comprising:

a pad hold-down spring for a brake pad backplate for a disc brake, which comprises two openings into which lugs of the brake pad backplate are configured to engage in order to secure the pad hold-down spring on the brake pad backplate such that the pad hold-down spring cannot loosen, a sequence of differently inclined contact surfaces extends between the two openings via which the pad hold-down spring can be supported on a stationary abutment of the disc brake, and curvatures of the contact surfaces being selected transversely with respect to a longitudinal extent of the pad hold-down spring such that the pad hold-down spring is tilted between the abutment and the brake pad backplate during a braking stroke;

wherein a curved portion of the pad hold-down spring rests on the brake pad backplate thereby supporting the tilting movement of the pad hold-down spring; and wherein the curved portion of the pad hold-down spring that rests on the brake pad backplate is curved transversely with respect to the longitudinal extent of the pad hold-down spring.

14. The disc brake according to claim 13, in which the spring is configured to produce a torque acting in a direction opposite to a direction of tilt and in relation to the brake pad backplate as a result of a tilting movement.

15. The disc brake according to claim 13, in which an angle of inclination of the inclined contact surfaces is selected such that a radius with respect to a tilting movement corresponds to at least half of a distance between a top surface of the brake pad backplate and a bottom surface of the abutment.

16. The disc brake according to claim 13, wherein the curved portion of the pad hold-down spring is convex with respect to the brake pad backplate.

17. The disc brake according to claim 16, wherein the curved portion of the pad hold-down spring contacts a top surface of the brake pad backplate.

* * * * *